United States Patent [19]

Lachmann

[11] Patent Number: 4,615,434
[45] Date of Patent: Oct. 7, 1986

[54] CONVEYING EQUIPMENT

[76] Inventor: Hans P. Lachmann, 29 Drosselweg, 5 Köln (Cologne) 60, Fed. Rep. of Germany

[21] Appl. No.: 638,399
[22] PCT Filed: Dec. 8, 1982
[86] PCT No.: PCT/EP82/00258
§ 371 Date: Aug. 1, 1984
§ 102(e) Date: Aug. 1, 1984
[87] PCT Pub. No.: WO84/02324
PCT Pub. Date: Jun. 21, 1984

[51] Int. Cl.$^4$ ............................................. B65G 15/60
[52] U.S. Cl. ................................. 198/823; 198/833; 198/845
[58] Field of Search ............... 198/833, 823, 818, 845, 198/844, 846, 832

[56] References Cited

U.S. PATENT DOCUMENTS

| | | | |
|---|---|---|---|
| 826,312 | 7/1906 | Catlin | 198/833 X |
| 2,751,065 | 6/1956 | Thomson | 198/818 |
| 2,838,164 | 6/1958 | Duncan | 198/823 X |
| 3,381,799 | 5/1968 | Havelka | 198/833 X |
| 3,637,091 | 1/1972 | Mickelson | 198/844 |
| 3,869,574 | 3/1975 | Kume | 198/833 |
| 4,249,653 | 2/1981 | Kufferath-Kassner | 198/844 X |

FOREIGN PATENT DOCUMENTS

| | | |
|---|---|---|
| 933920 | 9/1955 | Fed. Rep. of Germany . |
| 3123147 | 12/1982 | Fed. Rep. of Germany . |
| 1112884 | 3/1956 | France . |
| 1147215 | 11/1957 | France . |
| 599890 | 6/1978 | Switzerland . |
| 1112785 | 5/1968 | United Kingdom . |
| 1119576 | 7/1968 | United Kingdom . |
| 603616 | 4/1978 | U.S.S.R. ............... 198/805 |

Primary Examiner—Joseph E. Valenza
Assistant Examiner—Jonathan D. Holmes
Attorney, Agent, or Firm—Karl F. Ross; Herbert Dubno

[57] ABSTRACT

A conveyor assembly wherein a transversely longitudinally flexible conveyor belt supported on guide rollers at its opposite ends is supported between these ends along opposite longitudinal edges by ropes or cables which rest on discs spaced along the conveyor and upon which, in turn, ride elements connected to these edges of the conveyor belt but which are not otherwise connected to the cables.

9 Claims, 10 Drawing Figures

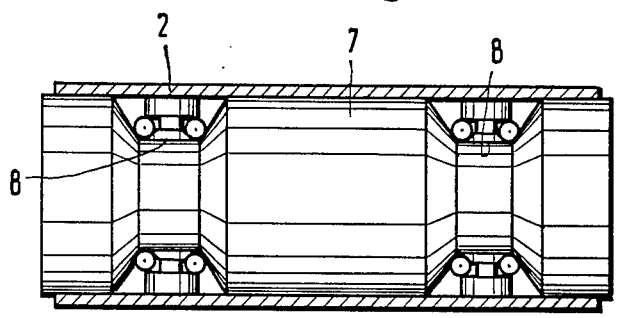
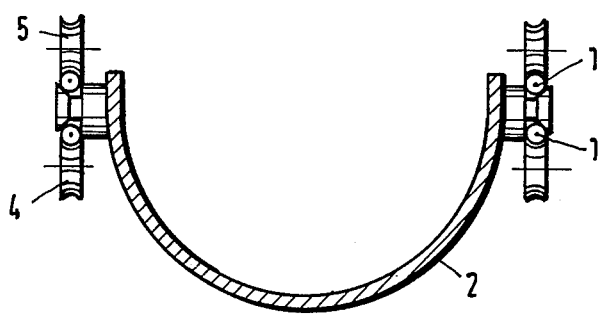
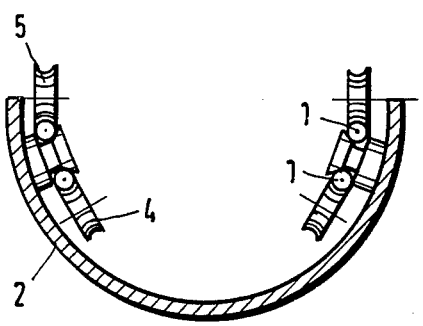
Fig. 3
Fig. 4

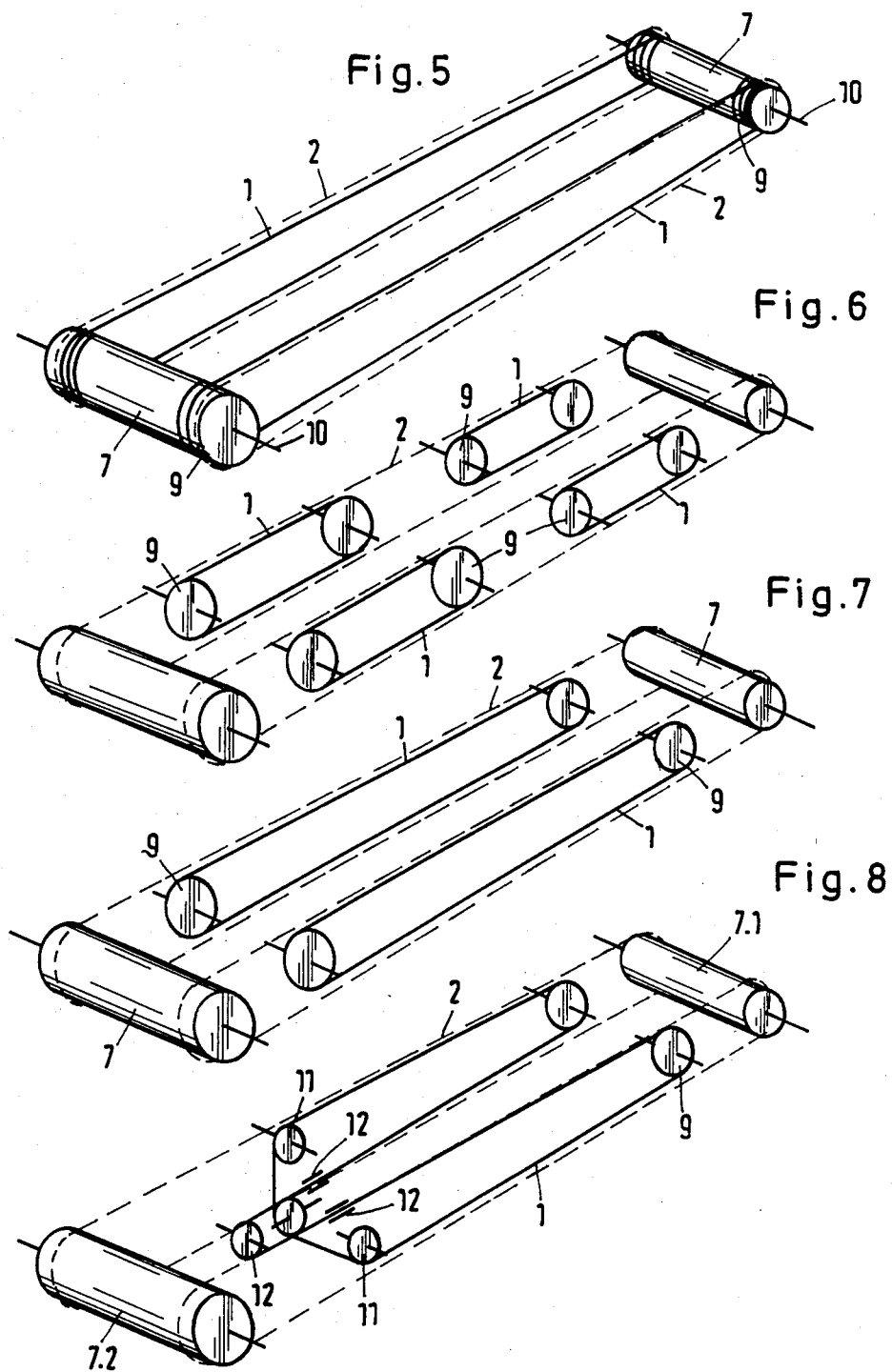

CONVEYING EQUIPMENT

CROSS REFERENCE TO RELATED APPLICATION

The present application is a national phase application corresponding to the International Application PCT/EP82/00258 filed Dec. 8, 1982.

FIELD OF THE INVENTION

The invention relates to a conveying equipment with an endless conveyor belt of rubber or of a similar material, which is guided over carrying pulleys via endless running elements provided in its marginal areas.

OBJECT OF THE INVENTION

It is the object of the invention to provide a conveyor where endless running elements have to be replaced only after very extended periods of time and wherein the replacement of the running elements or of sections thereof can be carried out with reduced time consumption.

SUMMARY OF THE INVENTION

This object is attained in accordance with the invention in that each running element consists of carrying elements attached to the conveyor belt and of at least one cable whereby the cable presents no rigid connection with the conveyor belt or with the carrying element attached to the conveyor belt.

The traction power required for driving the conveyor belt, in the case of the conveying equipment according to the invention, is transmitted mainly through the conveyor belt itself or through tension-resistant inserts imbedded in it, such as cables, cord, textures or the like.

Since the running elements do not have to transmit traction force, the cable of the running elements requires only a reduced cross section and consequently the rest of the cross section serves only for abrasion-resistance, so that the material of the running elements can be selected correspondingly in an optimal way. Consequently, the running elements have a large wear section and besides are subject only to reduce wear due to optimal material selection, so that the running elements last for a very long time and therefore have to be replaced only at relatively long time intervals. The replacement of a running element or of a portion thereof is facilitated by the fact that the running element or the portion of the running element resting on the carrying pulley is not firmly connected to the conveyor belt. Furthermore, only a minor effort is required to make the new running elements endless, i.e. to join the ends of the new section of the running element to the remaining part of the running element, because the connection area or connection areas essentially need only be compression-resistant and not traction-resistant. Another advantage of the invention consists in that the running elements can be suited to any desired conveyor belt.

Advantageously, each cable is provided with a surrounding casing. Each running element can have two cables. The return disks for the cable are mounted in the area of the driving and return pulley, respectively, of the conveyor belt. Each cable may be divided into several endless sections independent with regard to each other, whereby each section has its separate return disks.

Both cables can be connected with the conveyor belt via mounting supports bolted to the conveyor belt. The mounting supports have a round cross section and can be rotatably attached to the conveyor belt.

The cables can be attached to the conveyor belt with the aid of hooks, whereby the marginal area of the conveyor belt has holes and the hooks engage therein. The drive or return pulley for the conveyor belt has a recess of shape and dimensions selected to offer enough room to the running element. Furthermore, a driving traction force can be exerted on the conveyor belt as well as on the cables carrying the conveyor belt.

The latter enables a forced guidance of the conveyor belt with very reduced losses due to friction. Such a forced guidance of the conveyor belt is required for instance in the case of adjustments to differences in elevation and in the case of adjustments to curves.

BRIEF DESCRIPTION OF THE DRAWING

Several embodiments of the invention are represented in the drawing, in which:

FIG. 3 is a cross section through the conveyor belt of a conveying equipment in the area of the guide pulley;

FIG. 4 shows the upper and the lower runs of the conveyor belt of a conveying equipment with the pertaining running elements and carrying pulleys in cross section;

FIGS. 5 to 8 are schematic perspective representations of a conveyor belt with running elements and carrying pulleys;

SPECIFIC DESCRIPTION

Figure 1:
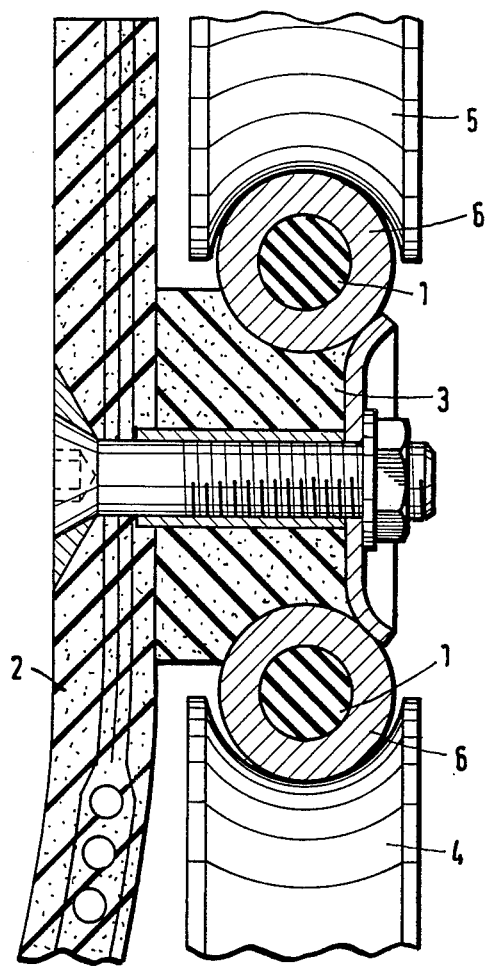
FIG. 1 is a cross-sectional view of a portion of the conveyor showing the right-hand marginal area of the conveyor belt.
Figure 2:
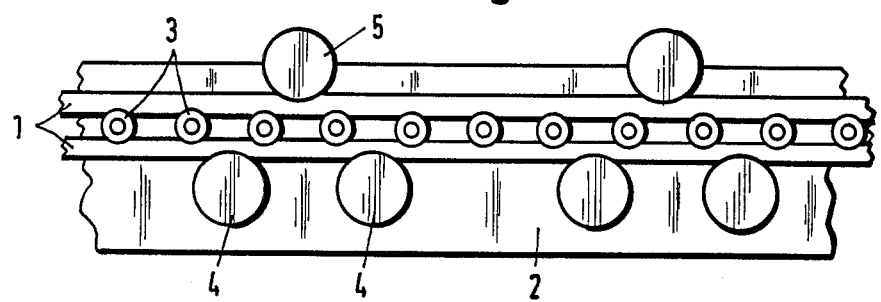
FIG. 2 shows a portion of the conveying equipment according to FIG. 1 containing the upper run of a conveyor belt in side view, but at a smaller scale.

As can be seen from FIGS. 1 and 2, the running element can have two cables 1. The portion of the running element connected with the conveyor belt 2 consists in this case of mounting supports 3 bolted with the conveyor belt 2. The mounting supports 3 have a round cross section (see FIG. 2). The bolting elements of the mounting supports 3 can be built so that the mounting supports 3 are rotatable. In addition to the carrying disks 4 carrying the lower cable 1, guiding disks 5 for the upper cable 1 are provided. The cables 1 are provided with a casing 6.

The guiding pulley 7 for the conveyor belt 2 represented in FIG. 3 is provided with recesses 8, which give sufficient room to the running elements, so that the return and/or the drive of the conveyor belt 2 are not obstructed.

In FIG. 4 can be seen that with the aid of the running element equipped with the two encased cables 1 a wide range of optional guidance of the conveyor belt 2 can be made possible via the carrying disks 4 and the guidance disks 5. The conveyor belt 2 can be guided upwardly or downwardly inclined, swung around a horizontal axis, as well as directed through curves, swung around a vertical axis.

In the embodiments represented in the FIGS. 5 to 8, in order to make more evident the travel of the cable 1 shown in full lines the edges of the conveyor belt 2 are shown in dotted lines. The carrying disks for the cables 1 are left out; represented are only the return disks 9. The return pulleys 7 for the conveyor belt 2 can also be built as drive pulleys.

Since in the embodiment according to FIG. 5 the cables 1 cooperate with the conveyor belt 2 over its entire length, the return disks 9 for the cable 1 are mounted in the area of the return pulleys 7 for the conveyor belt 2. The return disks 9 are journaled on the shafts 10 of the return pulleys 7, for this purpose.

In FIG. 6 the cable 1 is subdivided into two endless sections, independent with respect to each other, each of them having its own return disks 9.

In the embodiment according to FIG. 7 the cables 1 cooperate with the conveyor belt 2 almost over its entire length. Each of the return disks 9 is mounted closely before the return pulleys 7 for conveyor belt 2.

An especially suitable embodiment of the invention is shown in FIG. 8. In this case only one cable 1 is provided, which cooperates with the conveyor belt 2 almost over its entire length. While closely before the one of the return pulley 7.1 two return disks 9 are provided (corresponding to FIG. 7), closely before the other return pulley 7.2 several return disks 11 and 12 are provided, mounted so that the cable 1 is directed from one side of the conveyor belt 2 to the other side thereof.

Figure 9:
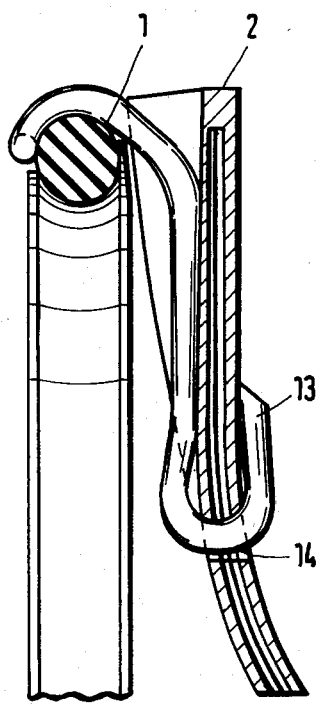
FIG. 9 shows a section of a conveying equipment containing the left-hand marginal area of the conveyor belt in cross section, wherein the cable forming the running element is attached to the conveyor belt by means of a hook.
Figure 10:
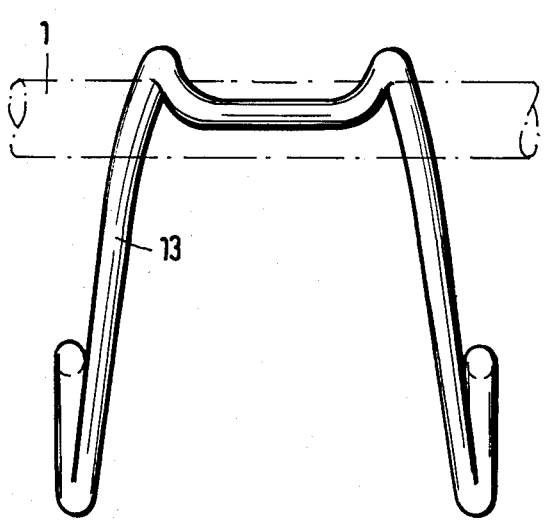
FIG. 10 shows the hook according to FIG. 9 in front view.

In the embodiments shown in FIGS. 9 and 10 the cable 1 is attached to the conveyor belt with the aid of hooks 13. For this purpose, the marginal areas of the conveyor belt 2 have holes 14 in which the hooks 13 are engaged. In FIG. 10 the cable 1 is shown in dotted lines.

I claim:

1. A conveyor-belt assembly comprising:
    a transversely and longitudinally flexible endless conveyor belt of substantially uniform thickness and formed with a pair of opposite longitudinal edges which, upon support, allows free sagging of the conveyor belt between said edges;
    a pair of guide rollers around which said belt passes at opposite longitudinally spaced ends of the assembly, said conveyor belt having a given length between said rollers;
    respective pairs of cables including an upper endless cable and a lower endless cable disposed along each of said longitudinal edges, for supporting the respective longitudinal edge over a substantial portion of said length of said conveyor belt between said rollers for entraining said belt;
    spaced-apart elements along each of said edges simultaneously contacted by a respective pair of said upper and lower cables but not otherwise connected thereto, said elements being directly fixed to said conveyor belt only at the respective longitudinal edge;
    respective discs rotatably supported adjacent each edge spaced along said conveyor belt and engaging the active run of a respective lower cable from below to support said lower cables and thereby support the respective longitudinal edges which rest upon the respective lower cables by the said elements in contact with lower cables; and
    respective upper discs guiding and engaging from above the active run of a respective upper cable of each pair, said upper discs being spaced along the length of said conveyor.

2. The assembly defined in claim 1 wherein said elements, said cables and said discs are disposed along an outer side of the conveyor belt when the latter has a sagging orientation.

3. The assembly defined in claim 1 wherein said elements, said pairs of cables and said discs are disposed along an inner side of said conveyor belt when said conveyor belt has a sagging orientation.

4. In a conveyor installation with an endless conveyor belt which is transversely and longitudinally flexible and is supported by means of support elements spaced along longitudinal edges of and fixed to the belt and supported upon cables at these edges which, in turn, are guided over support pulleys and in which these cables are not securely connected to the support elements, the improvement wherein above and below the support elements on each edge, a respective endless cable is guided and is received in each support element, the active run of upper one of these cables at each edge of said belt being guided from above by respective guide pulleys in addition to the guide pulleys over which the lower cable at each edge is guided.

5. The conveyor installation defined in claim 4 wherein each cable is surrounded by a sheath.

6. The conveyor installation defined in claim 4 wherein each cable is subdivided into a plurality of independent endless sections separate from one another with each section being deflected around a respective direction-change pulley.

7. The conveyor installation defined in claim 4 wherein the support elements each have a round cross section.

8. The conveyor installation defined in claim 7 wherein each of said support elements is mounted so as to rotate on the belt.

9. The conveyor installation defined in claim 4 wherein the support elements are hooks which are suspended in bores formed in edge regions of the belt.

* * * * *